(No Model.)
W. L. SALVAGE.
CHANGEABLE RIBBON SPOOL FOR TYPE WRITING MACHINES.
No. 428,860. Patented May 27, 1890.
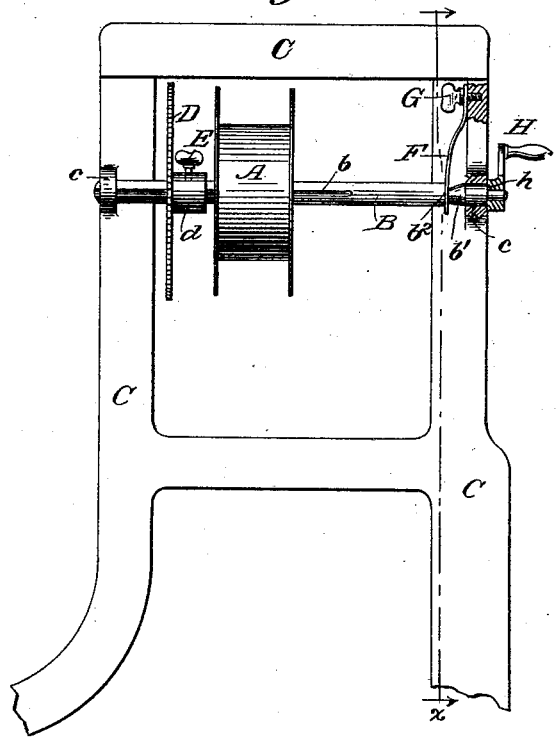
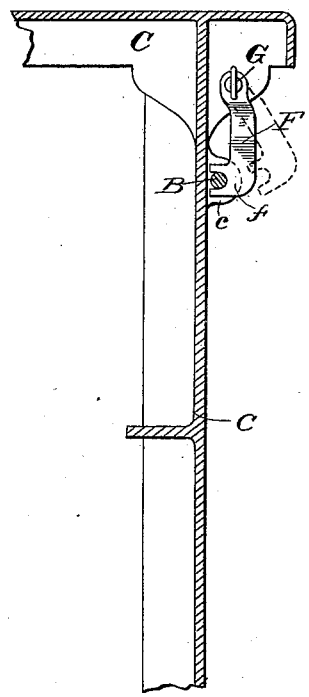
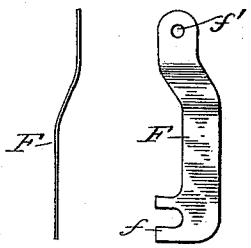
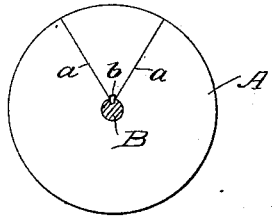
WITNESSES:
INVENTOR:
W. L. Salvage
BY
ATTORNEYS.

United States Patent Office.

WILLIAM L. SALVAGE, OF CHATTANOOGA, TENNESSEE.

CHANGEABLE RIBBON-SPOOL FOR TYPE-WRITING MACHINES.

SPECIFICATION forming part of Letters Patent No. 428,860, dated May 27, 1890.

Application filed May 3, 1889. Serial No. 309,441. (No model.)

*To all whom it may concern:*

Be it known that I, WILLIAM L. SALVAGE, of Chattanooga, in the county of Hamilton and State of Tennessee, have invented a new and useful Improvement in Changeable Ribbon-Spools for Type-Writing Machines, of which the following is a full, clear, and exact description.

My invention relates to type-writing machines of that class using an inking-ribbon to produce the type-written impressions; and the invention has for its object to provide simple, inexpensive, and efficient devices allowing the quick and easy substitution of inking-ribbons of the same or different colors and without soiling the hands of the operator, thus largely economizing time, especially when a large variety of work is required to be done on the same type-writer.

The invention consists in certain novel features of construction and combinations of parts of the inking-ribbon spool-changing devices, all as hereinafter described and claimed.

Reference is to be had to the accompanying drawings, forming a part of this specification, in which similar letters of reference indicate corresponding parts in all the figures.

Figure 1 is a side elevation, partly in section, of a portion of the frame of a Caligraph with one of my improved changeable ribbon-spools applied thereto. Fig. 2 is a front vertical section thereof, taken on the line $x\,x$ in Fig. 1. Figs. 3 and 4 are edge and face views, respectively, of the tension-spring used with the spool-shaft; and Fig. 5 is a side view of the ribbon-spool and a cross-section of its shaft.

The ribbon-spool A is mounted on a shaft B, which has a feather or spline $b$ fitted to a groove made in the spool to cause both shaft and spool to turn together as the shaft is rotated in its bearings $c\,c$ on the frame C of the type-writer, but allowing the spool to be shifted along the shaft to move the ribbon laterally, and also permitting the shaft to be pulled endwise from the spool when a change of ribbons is required, as hereinafter more fully explained.

On the side of the spool A are made two distinct marks or lines $a\,a$, which converge from the spool periphery to the slot in the spool into which the shaft-spline $b$ fits. (See Fig. 5 of the drawings.) These marks serve as unfailing guides by which the spool may be at once adjusted properly onto the shaft or with its slot in line with the shaft-spline, thus saving time in changing spools and ribbons.

On the spool-shaft is also placed a ratchet-wheel D, which is held in place by a thumb-screw E, threaded into the hub $d$ of the wheel, and adapted to bear upon the shaft or to be set at its point into a hole made in the shaft, to hold the ratchet-wheel securely to the shaft and allow it to be quickly loosened by turning the screw by the fingers and without the aid of a screw-driver or other tool, thus facilitating the changing of the spools.

At or near one end the spool-shaft has the usual annular reduced portion $b'$, which provides a shoulder $b^2$, against which presses the free hook-shaped lower end or head $f$ of a plate-spring F, which may have any required tension, and is held at its other end to the machine-frame C by a thumb-screw G, which is passed through a hole $f'$ in the spring and enters a screw-threaded hole in the frame. This plate-spring F is shown detached and about full size in Figs. 3 and 4, and is shown on a reduced scale and in operative positions in Figs. 1 and 2 of the drawings.

The spool-shaft is provided with the ordinary crank H, which is fitted onto a reduced end of the shaft and is larger in diameter at its base than the shaft, thereby providing a shoulder $h$ on the crank, which bears upon the frame C and prevents the spring F when pressing against the shaft-shoulder $b^2$ from forcing the shaft endwise. The friction thus induced between the crank-shoulder $h$ and the frame by the pressure of the spring prevents the shaft and spool from turning farther than they should when acted on by a pawl engaging the ratchet-wheel in the usual or any approved manner, not necessary to show or describe.

It will be understood that both ribbon-spools of a Caligraph or other type-writing machine will be fitted to shafts held to the machine-frame, and will have a spring F arranged with their shafts in the manner and for the purposes above set forth.

The operation of changing an inking-ribbon of one color for a ribbon having a different color is very simple, and is easily performed as follows: The ribbon in use on the type-writer will be wound onto one of its two spools by turning the spool-crank H. The thumb-screw G will then be loosened and the spring F swung a little forward clear of the shoulder $b^2$ of the spool-shaft, whereupon the spool holding the ribbon will be slipped on the shaft toward the crank to allow the ratchet-wheel set-screw E to be loosened, and when this is done the ratchet-wheel and spool will be held by one hand while the shaft B is pulled from them by the other hand, and when the wheel and spool are removed and laid down another spool having an inking-ribbon of the desired color will be slipped onto the shaft, the marks $a$ $a$ on the spool serving as guides, and when the ratchet-wheel is again slipped onto the shaft the latter will be pushed forward again into its outer bearing, and when the spring F is again swung down to engage the shaft and press onto its shoulder $b^2$ the ratchet-wheel will be fastened by tightening its screw E, and when the loose end of the ribbon is run across and fastened to the other empty spool of the type-writer the machine is ready for use.

It is obvious that the inking-ribbon can be very quickly and conveniently changed and without greatly, if at all, soiling the hands of the operator, who may at once resume writing with the new ribbon. No time will be lost in cleaning ink from the hands, which is almost always necessary when one ribbon is wound off onto one of the two spools of a machine, and is then wound onto a third separate spool and a new ribbon is then wound onto one spool of the machine and run across to its other spool.

My changeable ribbon-spool devices thus promote quick and cleanly substitution of ribbon-spools, and are adapted for use on all machines using ribbons to produce the type-written impressions.

Having thus described my invention, what I claim as new, and desire to secure by Letters Patent, is—

1. In changeable ribbon-spools for type-writers, the combination, with the spool-shaft journaled to the machine-frame and capable of endwise movement and provided with a shoulder, of a spring held pivotally at one end to the frame and bearing at its free end against the shaft-shoulder, and a stop limiting the endwise movement of the shaft by the spring, substantially as herein set forth.

2. In changeable ribbon-spools for type-writers, the combination, with the spool-shaft journaled to the machine-frame and capable of endwise movement and provided with a shoulder, of a plate-spring held pivotally at one end to the machine-frame and provided at its free end with a hook-head engaging the shaft next its shoulder and bearing thereon, and a stop limiting the endwise movement of the shaft by the spring, substantially as herein set forth.

3. In changeable ribbon-spools for type-writers, the combination, with the machine-frame, of a shaft B, journaled thereon and provided with a reduced portion $b'$, forming a shoulder $b^2$, a ribbon-spool splined to the shaft, a plate-spring F, held by a thumb-screw G to the machine-frame and having a hook-head $f$, engaging the shaft at its shoulder $b^2$, and a stop limiting the endwise movement of the shaft by the spring, substantially as herein set forth.

4. In changeable ribbon-spools for type-writers, the combination, with the machine-frame, of a shaft B, journaled thereon and having a reduced portion $b'$, forming a shoulder $b^2$, a ribbon-spool splined to the shaft, a ratchet-wheel D, held to the shaft by a screw E, a plate-spring F, held by a screw G to the machine-frame and having a hook-head $f$, engaging the shaft next its shoulder $b^2$, and a crank H on the shaft and forming a stop limiting the endwise movement of it by the spring, substantially as herein set forth.

5. In a changeable ribbon-spool for type-writers, the combination of a shaft journaled in the machine-frame and capable of endwise movement and provided with a shoulder, a spring held pivotally at one end to the frame and having its free end bearing against the shoulder of the shaft, a stop for limiting the endwise movement of the shaft, and a spool and ratchet-wheel detachably secured on the said shaft, substantially as herein shown and described.

WM. L. SALVAGE.

Witnesses:
R. D. WARREN,
D. LAUCK GRAYSON.